United States Patent
Yuan et al.

(10) Patent No.: US 12,328,787 B2
(45) Date of Patent: Jun. 10, 2025

(54) SYSTEMS AND METHODS FOR SERVICE BASED NETWORK RESOURCE ALLOCATION

(71) Applicant: VERIZON PATENT AND LICENSING INC., Basking Ridge, NJ (US)

(72) Inventors: Jun Yuan, Cranbury, NJ (US); Hongkun Li, Malvern, PA (US); Weimin Shi, Bridgewater, NJ (US); Anil Babu Vontikommu, Morris Plains, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 393 days.

(21) Appl. No.: 17/873,763

(22) Filed: Jul. 26, 2022

(65) Prior Publication Data
US 2024/0040657 A1 Feb. 1, 2024

(51) Int. Cl.
*H04W 76/22* (2018.01)
(52) U.S. Cl.
CPC .................. *H04W 76/22* (2018.02)
(58) Field of Classification Search
CPC .................................... H04W 76/22
See application file for complete search history.

(56) References Cited

U.S. PATENT DOCUMENTS

| | | | |
|---|---|---|---|
| 9,949,245 B2* | 4/2018 | Zhang | H04W 76/16 |
| 2017/0013668 A1* | 1/2017 | Chang | H04W 76/19 |
| 2017/0064601 A1* | 3/2017 | Kubota | H04W 36/304 |
| 2019/0104456 A1* | 4/2019 | Kubota | H04W 48/18 |
| 2019/0342824 A1* | 11/2019 | Futaki | H04W 36/0077 |
| 2019/0342932 A1* | 11/2019 | Futaki | H04W 76/16 |
| 2019/0349906 A1* | 11/2019 | Futaki | H04L 5/0091 |
| 2022/0030659 A1* | 1/2022 | Kim | H04W 76/19 |
| 2022/0046522 A1* | 2/2022 | Kim | H04W 52/365 |
| 2022/0132294 A1* | 4/2022 | Shah | H04W 8/02 |
| 2022/0151001 A1* | 5/2022 | Vivanco | H04W 24/02 |
| 2022/0167244 A1* | 5/2022 | Zaus | H04W 60/04 |
| 2023/0188992 A1* | 6/2023 | Schliwa-Bertling | H04W 12/10 726/6 |

* cited by examiner

*Primary Examiner* — Fahmida S Chowdhury

(57) ABSTRACT

A novel method for service based network resource allocation is disclosed. In one embodiment, a method is disclosed comprising receiving from a UE at a base station over a Primary Cell (PCell), a request message to perform an action with respect to a Secondary Cell (SCell), the request message including service information. The method then determines a specific action to be performed with respect to the SCell based on the service information. Finally, the method performs the specific action with respect to the SCell at the base station and transmits a connection reconfiguration message to the UE to direct the UE to perform the specific action based on a service to be supported.

20 Claims, 6 Drawing Sheets

SYSTEMS AND METHODS FOR SERVICE BASED NETWORK RESOURCE ALLOCATION

BACKGROUND

Current radio access networks (RANs) implementations lack base-station level awareness of application-specific or service-specific traffic corresponding to a given user equipment (UE). As such, said RAN implementations cannot allocate resources or otherwise dynamically adapt to inputs from applications that have different requirements and characteristics.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

In the embodiments, the method provides base station-level awareness of specific traffic corresponding to a given UE. For example, in a RAN implementing Carrier Aggregation (CA), a base station (e.g., gNodeB ("gNB") or eNodeB ("eNB")) in a Primary Cell ("PCell") role can automatically activate a Secondary Cell ("SCell") in response to specific Quality of Service (QoS) requirements from a UE. However, depending on the application or service responsible for the traffic, the SCell may not be needed, and the additional network resources may be unnecessarily allocated to the UE.

In an embodiment, a base station of a RAN can receive a message including service information corresponding to service-specific traffic to the UE. The disclosure places no limit on the type of services; however, examples include Internet-of-Thing (IoT) services, smartphone/tablet services, smart sensor services, video/audio communication services, etc. In some embodiments, the message can be received from a Network Function (NF) of the RAN or a core network. In some embodiments, the base station can be operatively connected to the UE through a PCell. In some embodiments, based on the service information, the base station can determine an action to be performed with respect to an SCell or a plurality of SCells. In some embodiments, the base station can determine whether to add, release, activate, de-activate, and/or modify one or more SCells. In some embodiments, the base station can communicate to the UE the action to be performed.

In an embodiment, a base station can receive a request message from a UE to perform an action with respect to one or more SCells. In some embodiments, the request message can include service information of a service running in the UE. In some embodiments, the request message can include a novel SCell activation cause parameter. In some embodiments, the SCell activation cause parameter can indicate the type of service running in the UE. In some embodiments, the SCell activation cause parameter can be provided by the UE to the base station, and vice versa, using Radio Resource Control (RRC) layer signaling. In some embodiments, the base station can determine a specific action to be performed based on the service information received from the UE. In some embodiments, the base station can perform the specific action. For example, after the base station determines that an SCell needs to be activated to take over the service-specific traffic, the base station can activate the SCell on its end. Then, in some embodiments, the base station can communicate with the UE to direct the UE to perform the specific action on the UE.

Figure 1:
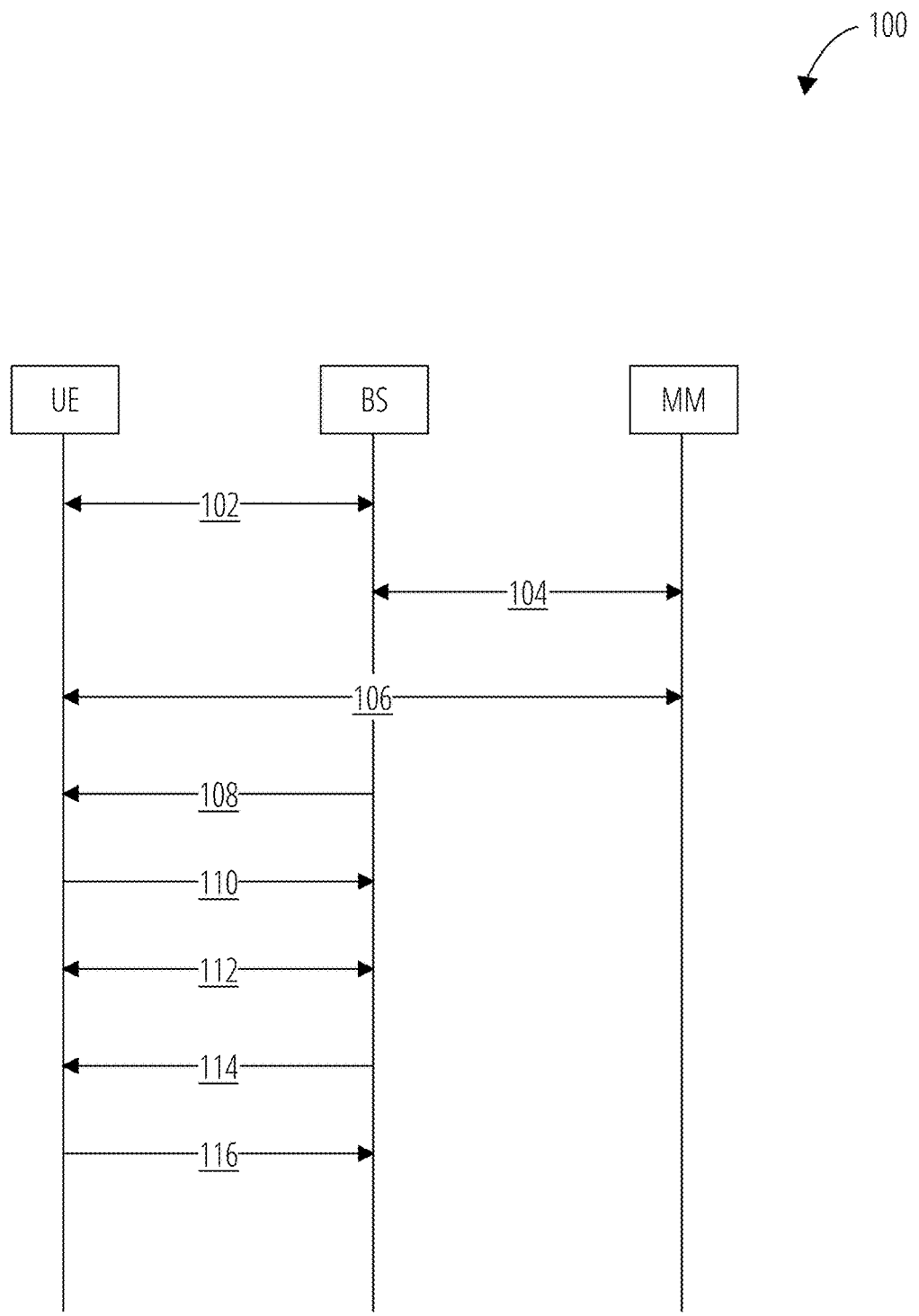
FIG. 1 is a call flow diagram illustrating a method for providing network resource allocation according to an embodiment.

FIG. 1 is a call flow diagram illustrating a method for providing service differentiated network resource allocation according to an embodiment.

In Step 102, method 100 can comprise an RRC Setup. In some embodiments, an RRC Setup can include establishing an RRC connection between a UE and a base station (e.g., a gNodeB or eNodeB) of a RAN using a PCell. In an embodiment, a 5G or 4G connection setup procedure can be implemented. For example, in one embodiment, Step 102 can include the UE issuing an RRC connection request to the base station. In response, the base station can return an RRC Connection Setup Message to the UE. The UE can then transmit an RRC Connection Setup Complete Message to confirm the connection.

In Step 104, method 100 can comprise a registration request operation. In some embodiments, in a registration request operation, a base station can issue a registration request to a mobility manager (MM) of a core network. In some embodiments, a mobility manager can be an NF, such as an Access and Mobility Management Function (AMF) of a core network. In one embodiment, in Step 104, the registration request can comprise a registration request message received from the UE with the RRC Connection Setup Complete Message. In some embodiments, the registration request message can include various Information Element (IE) fields such as Evolved Packet System (EPS) attach type, EPS mobile identity, UE network capabilities, EPS Session Management message containers, etc. Additional fields can be included.

In Step 106, method 100 can comprise an authentication operation. In some embodiments, an authentication operation can comprise the MM and/or other NFs of the core network authenticating the UE using non-access stratum (NAS) signaling. In some embodiments, the MM can communicate with an Authentication Server Function (AUSF) (not shown) to authenticate the UE. In an embodiment, during the authentication operation, the MM can provide the UE with a NAS security algorithm. Then, in an embodiment, the UE can respond indicating the completion of a NAS security procedure. In an embodiment, after Step 106, a ciphered link can be established between the MM (or other NFs of the core function) and the UE.

In Step 108, method 100 can comprise a UE Capability Enquiry operation. In some embodiments, a UE Capability Enquiry operation can include the base station sending a UE Capability Enquiry to the UE. In some embodiments, the UE Capability Enquiry operation determines a UE's capability for supporting CA and the band combinations supported by the UE.

In Step 110, of method 100, the UE can respond to the UE Capability Enquiry by transmitting UE capability information to the base station. In some embodiments, the UE capability information can indicate whether the UE supports CA. In some embodiments, the UE capability information can include the CA band combinations supported by the UE. In some embodiments, the UE capability information can include the non-CA bands supported by the UE. In some embodiments, the UE capability information can include other UE capabilities. In some embodiments, the base station can forward the UE capability information to the MM to store or update UE capability information of the UE in the MM.

In Step 112, method 100 can comprise an RRC Security operation. In some embodiments, during an RRC Security operation the base station can indicate to the UE to start an integrity protection and encryption process using a Security Mode Command message. In some embodiments, the Security Mode Command message can include an integrity protection and encryption algorithm. In some embodiments, the UE can reply to the base station with an encryption key derived from the integrity protection and encryption algorithm. In some embodiments, Step 110 results in the encryption of downstream and/or upstream traffic.

In some embodiments, Steps 102-110 can be referred to as an RRC Initialization process. In some embodiments, Steps 102-110 can result in the UE establishing a secure connection to the base station and/or the core network.

In Step 114, method 100 can comprise an RRC Connection Reconfiguration operation. In some embodiments, an RRC Connection Reconfiguration operation can include the base station issuing an RRC Connection Reconfiguration Message to the UE. In some embodiments, an RRC Connection Reconfiguration Message can include instructions for configuring an RRC Component or Function. In some embodiments, the instructions can include establishing, modifying, and/or releasing a Radio Bearer. In some embodiments, the Radio Bearer may have been established or configured during an RRC Setup operation. In some embodiments, the instructions can include performing a measurement of one or more signal parameters.

In some embodiments, the RRC Connection Reconfiguration Message can include instructions to configure CA at the UE based on the UE Capability information. In some embodiments, the instructions can include adding, releasing, activating, de-activating, and/or modifying one or more SCells. In some embodiments, the base station can communicate to the UE (e.g., using the RRC Connection Reconfiguration Message) which band combinations can be used for CA (e.g., n5+n77, a FR1 band+a FR2 band). In some embodiments, the base station can select the band combinations for Downlink and/or Uplink respectively based on the UE capability information provided by the UE.

In some embodiments, in Step 114, upon receiving an RRC Connection Reconfiguration Message including instructions to add an SCell, the UE can add the SCell. In some embodiments, the SCell can operate on a different frequency than the PCell. In some embodiments, the SCell provides additional radio and/or network resources to the UE. In some embodiments, the added SCell can be in an inactive state (e.g., no traffic is transferred on the SCell).

In some embodiments, the UE can be directed by the base station through the RRC Connection Reconfiguration Message to activate (or de-activate) the SCell (e.g., traffic can be transferred over the SCell or no traffic can be transferred over the SCell, respectively) by the base station. In some embodiments, the base station can also indicate to the UE the type of traffic to be transferred to and/or from the SCell.

In some embodiments, the base station can direct the UE to activate/deactivate through a parameter included in the RRC Connection Reconfiguration Message. In some embodiments, the RRC Connection Reconfiguration Message can include an sCellToAddModList parameter (as a part of the CellGroupConfig parameter) to add or modify the SCell at the UE. In some embodiments, the RRC Connection Reconfiguration Message can include an sCellIndex parameter indicating an SCell and a corresponding sCellState parameter that can be set to activated or de-activated to indicate the state of the cell.

In some embodiments, in Step 114, the UE can be directed to activate/de-activate the SCell using a Medium Access Control (MAC) layer Control Element (CE) instead of or in addition to the RRC Connection Reconfiguration Message. In some embodiments, a MAC CE can be a bitmap indicating whether one or more SCells may be activated/deactivated. In some embodiments, the UE, the base station, and/or an NF of the RAN or the core network can communicate using MAC layer signaling.

In Step 116, method 100 can comprise the UE replying to the RRC Connection Reconfiguration Message by sending an RRC Reconfiguration Complete Message to the base station. In some embodiments, an RRC Reconfiguration Complete Message can include confirmation that an SCell has been added, released, activated, de-activated, and/or modified.

Figure 2:
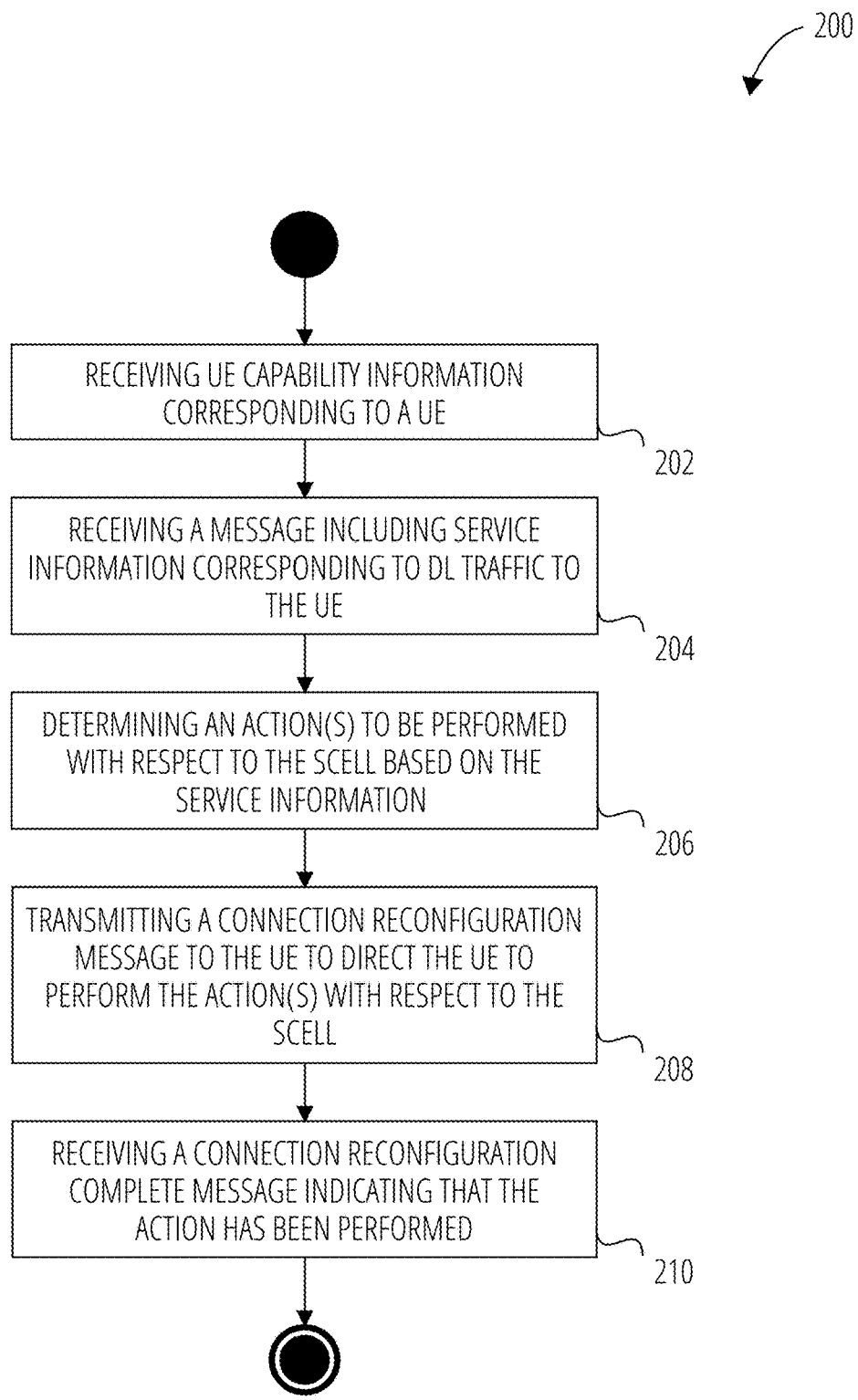
FIG. 2 is a flow diagram illustrating a method for providing service differentiated network resource allocation according to an embodiment.

FIG. 2 is a flow diagram illustrating a method 200 for providing service differentiated network resource allocation according to an embodiment.

In Step 202, method 200 can comprise receiving UE capability information corresponding to a UE. In some embodiments, the UE capability information can be received during an RRC Initialization process (e.g., Steps 102-110 discussed above with respect to FIG. 1) establishing a connection between the UE and a base station using a PCell. In some embodiments, the UE capability information can be received at a base station of a 4G or 5G access network (e.g., eNB or gNB).

In some embodiments, the UE can be a Mobile Termination (MT) UE. In some embodiments, an MT UE can be the termination point of traffic corresponding to a specific service. For example, in some embodiments, Voice over New Radio (VoNR) service allows for voice calls between two users—an initiating user and a recipient. In some embodiments, an MT UE can be a UE of a recipient of a call using VoNR.

In some embodiments, the UE capability information can include band combinations supported by the UE in a CA arrangement. In some embodiments, the UE capability information can indicate whether the UE supports simultaneous connectivity to a plurality of base stations (e.g., to a gNB and an eNB) in a Dual Connectivity (DC) arrangement.

In Step 204, method 200 can comprise receiving a message including traffic or service information corresponding to downlink (DL) traffic to the UE. In some embodiments, the service information can correspond to uplink (UL) traffic from the UE. In some embodiments, the message can be sent from an NF of a core network or a RAN to the base station. In some embodiments, the message can be sent from the NF to a base station using N2 signaling. In some embodiments, the service information can correspond to the type of service generating the traffic.

In some embodiments, the service information can correspond to a QoS related to the traffic. In some embodiments, the service information can correspond to a signal measurement (e.g., bandwidth, signal strength, and the like) related to a signal sent to or received from the UE. In some embodiments, the service information can correspond to a connection metric (e.g., speed, latency, throughput, and the like) between the UE and the base station.

In Step 206, method 200 can comprise determining an action to be performed with respect to a SCell based on the service information. In some embodiments, the action can include adding, releasing, activating, de-activating, and/or modifying one or more SCells. For example, in some embodiments, method 200 can determine the action based on a signal measurement indicated in the service information. In another example, method 200 can determine the action based on the type of service (e.g., VoNR). In some embodiments, method 200 may determine that no action is required based on the service information. In some embodiments, where an SCell is already activated, method 200 can determine that the SCell be modified and/or de-activated. In some embodiments, where a plurality of SCells are already activated, method 200 can determine that a subset of the plurality of SCells be modified and/or de-activated. In some embodiments, where an SCell is already active, method 200 can determine that an SCell parameter (e.g., a band combination) be modified. In some embodiments, method 200 can determine that one or more actions be performed with respect to the SCell. In some embodiments, method 200 can determine that one or more actions be performed with respect to each of a plurality of SCells.

In Step 208, method 200 can transmit a connection reconfiguration message to the UE indicating the action or actions to be performed by the UE with respect to the SCell(s). In some embodiments, the connection reconfiguration message can be an RRC Connection Reconfiguration Message. In some embodiments, upon receiving the connection reconfiguration message the UE can accomplish the action or actions indicated in the connection reconfiguration message.

In Step 210, method 200 can comprise receiving a reconfiguration complete message at the base station from the UE. In some embodiments, the reconfiguration complete message can be an RRC Reconfiguration Complete Message.

In some embodiments, instead of performing Steps 208-210, method 200 can comprise transmitting the action or actions to be performed with respect to the SCell(s) to the UE using MAC layer signaling.

Figure 3:
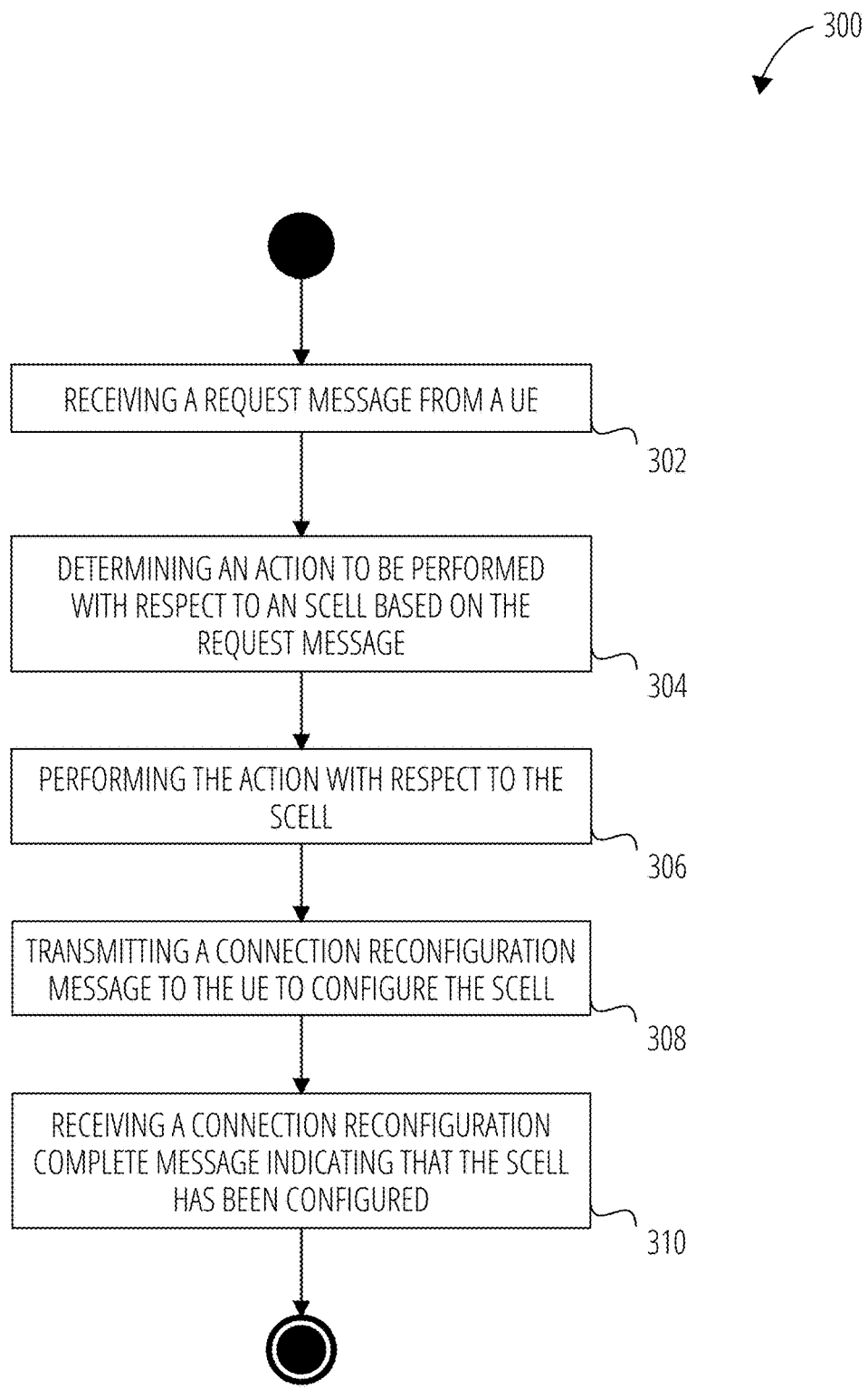
FIG. 3 is a flow diagram illustrating a method for providing service differentiated network resource allocation according to an embodiment.

FIG. 3 is a flow diagram illustrating a method 300 for providing service differentiated network resource allocation according to an embodiment.

In Step 302, method 300 can comprise receiving a request message from a UE. In some embodiments, the request message can include a request to perform an action or actions with respect to one or more SCells. In some embodiments, the request is a general request to perform an action, but a specific action is not provided. In some embodiments, the action is a suggested action by the UE. In some embodiments, the action is a specific action by the UE. In some embodiments, the UE can be a Mobile Originated (MO) UE. In some embodiments, an MO UE can be the starting point of traffic corresponding to a specific service. For example, in some embodiments, an MO UE can be initiating a VoNR call or service.

In some embodiments, the request message can be received at a base station. In some embodiments, the request message can be received by an NF of a RAN or a core network and then communicated to a base station using control signaling. In some embodiments, Step 302 can be preceded by an RRC Initialization process. In some embodiments, Step 302 can be preceded by an RRC Initialization process and an RRC Connection Reconfiguration process (e.g., Steps 114-116 discussed in relation to FIG. 1). In some embodiments, the request message can include the action or actions to be performed.

In some embodiments, the request message can include traffic or service information. In some embodiments, the service information can correspond to DL traffic to the UE. In some embodiments, the service information can correspond to UL traffic from the UE. In some embodiments, the request message can include a key performance indication (KPI) or measurement corresponding to a signal transmitted or received by the UE and/or the base station.

For example, in some embodiments, where the service is a VoNR service, the service information can be related to a VoNR KPI. In some embodiments, a VoNR KPI can be a Call Setup Time, a Call Drop Rate, a Voice Packet Gap (RTP Gap), and the like. In some embodiments, VoNR service can present increased call drop rates when the signal between the UE and the base station over the PCell is weak (e.g., when the UE is at the edge of the PCell). Similarly, in some embodiments, VoNR service can present increased voice packet gaps leading to a lower Mean Opinion Score (MOS) value (e.g., low voice quality). In those embodiments, the request message can include a request to add, release, activate, de-activate, or modify an SCell (e.g., implement CA or DC).

According to some embodiments, a novel parameter, SCell activation cause, is provided. In some embodiments, the SCell activation cause parameter can be defined in an RRC layer protocol. In some embodiments, the SCell activation cause can be included in a UEAssistanceInformation message as understood with the respect to RRC Signaling. In some embodiments, the SCell activation cause can be a service type. In some embodiments, the SCell activation cause can be Mobile Originated (MO) voice, Mobile Terminated (MT) voice, Ultra-Reliable Low Latency Communications (URLLC) MO data, and regular MO data. In some embodiments, the request message can include the SCell activation cause. In some embodiments, the request message can be sent as part of RRC layer signaling. In some embodiments, request message can be a UEAssistanceInformation message from the UE to the base station including the SCell activation cause parameter.

In Step 304, method 300 can comprise determining a specific action or actions to be performed with respect to an SCell based on the request message. In some embodiments, the specific action can include adding, releasing, activating, de-activating, and/or modifying an SCell. In some embodiments, the specific action can include adding, releasing, activating, de-activating, and/or modifying one or more SCells.

In some embodiments, method 300 can comprise determining the specific action to be performed based on a UEAssistanceInformation message. In some embodiments, method 300 can determine the specific action to be performed based on an SCell activation cause parameter. For example, in some embodiments, for URLLC MO data, method 300 can determine that two SCells be added. In another example, in some embodiments, for regular MO data, method 300 can determine that no SCells be added. In some embodiments, where the request message includes the specific action(s) to be performed, in Step 304, method 300 can determine whether the specific action is appropriate.

In some embodiments, where an SCell is already active, method 300 can determine that the SCell be modified and/or deactivated. In some embodiments, where a plurality of SCells are active, method 300 can determine that a subset of the plurality of SCells be modified and/or deactivated. In some embodiments, where an SCell is already activated, method 300 can determine that an SCell parameter (e.g., a band combination) be modified.

In Step 306, method 300 can comprise performing the specific action(s) at the base station. In some embodiments, where the request message is received at the RRC layer, method 300 can comprise providing the SCell activation cause parameter to a MAC layer so that a MAC layer function can determine whether to activate an SCell. In some embodiments, the SCell can be one of a plurality of SCells. In some embodiments, the MAC layer function can determine how many and which SCells to activate (or de-activate) based on the SCell activation cause.

In Step 308, method 300 can comprise transmitting a connection reconfiguration message to the UE indicating the specific action(s) to be performed with respect to the SCell(s). In some embodiments, the connection reconfiguration message can be an RRC Connection Reconfiguration Message. In some embodiments, upon receiving the RRC Connection Reconfiguration Message the UE can accomplish the specific action(s) indicated in the RRC Connection Reconfiguration Message.

In Step 310, method 300 can comprise receiving a reconfiguration complete message at the base station from the UE. In some embodiments, the reconfiguration complete message can be an RRC Reconfiguration Complete Message.

In some embodiments, instead of performing Steps 308-310, method 300 can comprise transmitting the specific action(s) to be performed with respect to the SCell(s) to the UE using MAC layer signaling.

Figure 4:
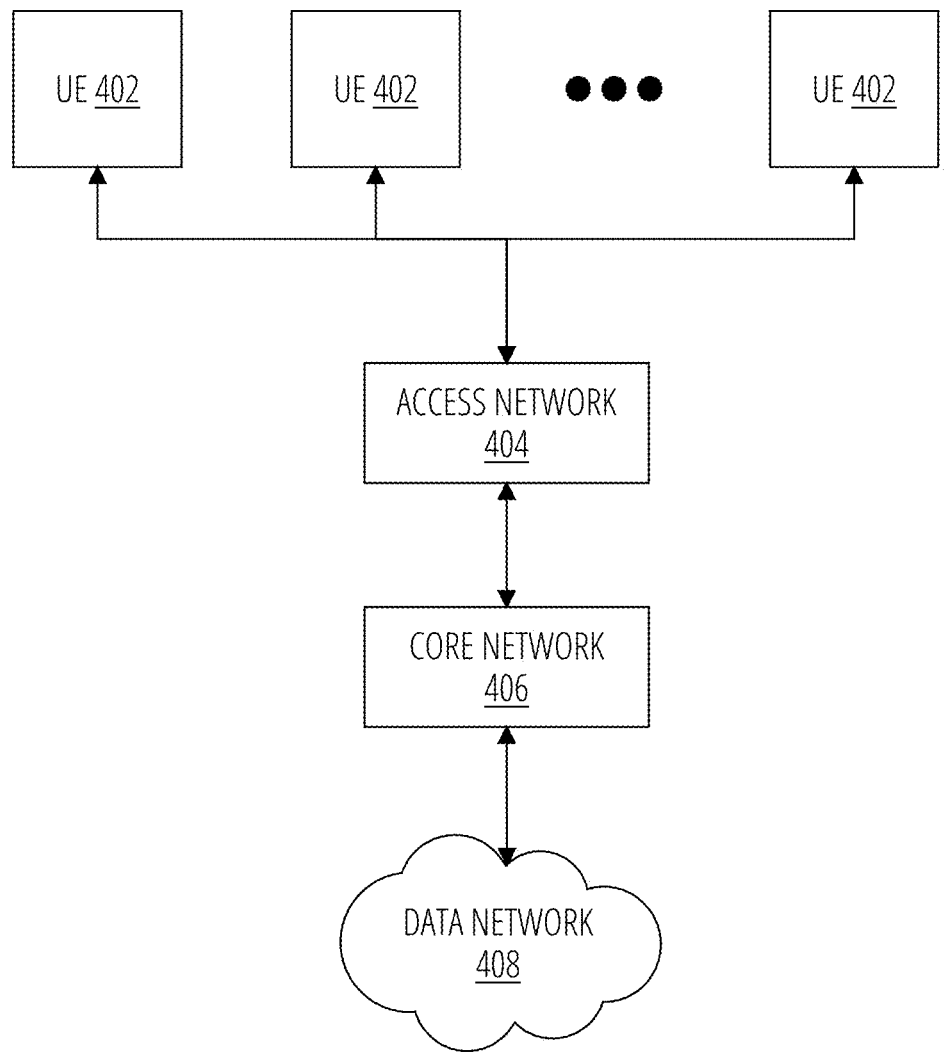
FIG. 4 is a block diagram of a cellular network according to some embodiments.

FIG. 4 is a block diagram of an example network architecture according to some embodiments of the present disclosure.

In the illustrated embodiment, UE 402 accesses a data network 408 via an access network 404 and a core network 406. In the illustrated embodiment, UE 402 comprises any computing device capable of communicating with the access network 404 (e.g., device 600 discussed in relation to FIG. 6). As examples, UE 402 may include mobile phones, smart devices, tablets, laptops, sensors, IoT devices, autonomous machines, unmanned aerial vehicles (UAVs), wired devices, wireless handsets, augmented reality/virtual reality (AR/VR) devices (e.g., AR/VR glasses) and any other devices equipped with a cellular or wireless or wired transceiver.

In the illustrated embodiment of FIG. 4, the access network 404 comprises a network allowing network communication with UE 402. In general, the access network 404 includes at least one base station that is communicatively coupled to the core network 406 and coupled to zero or more UE 402.

In some embodiments, the access network 404 comprises a cellular access network, for example, a fifth-generation (5G) network or a fourth-generation (4G) network. In one embodiment, the access network 404 can comprise a NextGen Radio Access Network (NG-RAN), which can be communicatively coupled to UE 402. In an embodiment, the access network 404 may include a plurality of base stations (e.g., eNodeB (eNB), gNodeB (gNB)) communicatively connected to UE 402 via an air interface. In one embodiment, the air interface comprises a New Radio (NR) air interface. For example, in a 5G network, UE 402 can be communicatively coupled to each other. In some embodiments, for example, such coupling can be via Wi-Fi functionality, Bluetooth, or other forms of spectrum technologies, and the like.

In some embodiments, UE 402 can communicate over a PCell of a base station. In some embodiments, UE 402 can communicate over a PCell and one or more SCells of the same base station, simultaneously. In some embodiments, this arrangement can be referred to as CA. In some embodiments, in CA, a UE 402 can simultaneously transmit and receive data on multiple component carriers (e.g., cells) from a single base station. In some embodiments, UE 402 can be connected to a PCell of a first base station and one or more SCells of a second, different base station simultaneously. In some embodiments, this arrangement can be referred to as Dual Connectivity (DC). In some embodiments, in DC, the first base station can be a gNB while the second base station can be an eNB, or vice versa. In some embodiments, PCells and SCells can be referred to as network resources.

In the illustrated embodiment, the access network 404 provides access to a core network 406 to the UE 402. In the illustrated embodiment, the core network may be owned and/or operated by a network operator (NO) and provides wireless connectivity to UE 402 via access network 404. In the illustrated embodiment, this connectivity may comprise voice and data services.

At a high-level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 402 to elements of the core network 406 and to external network-attached elements in a data network 408 such as, but not limited to, the Internet, a local area network (LAN), a wireless LAN, a wide area network (WAN), a mobile edge computing (MEC) network, a private network, a cellular network, and the like. In some embodiments, network elements may be physical elements such as router, servers and switches or may be virtual network functions implemented on physical elements.

In the illustrated embodiment, the access network 404 and the core network 406 may be operated by a NO. However, in some embodiments, the networks (404, 406) may be operated by a private entity, different entities, and the like, and may be closed to public traffic. In these embodiments, the operator of the device can simulate a cellular network, and UE 402 can connect to this network similar to connecting to a national or regional network.

Figure 5:
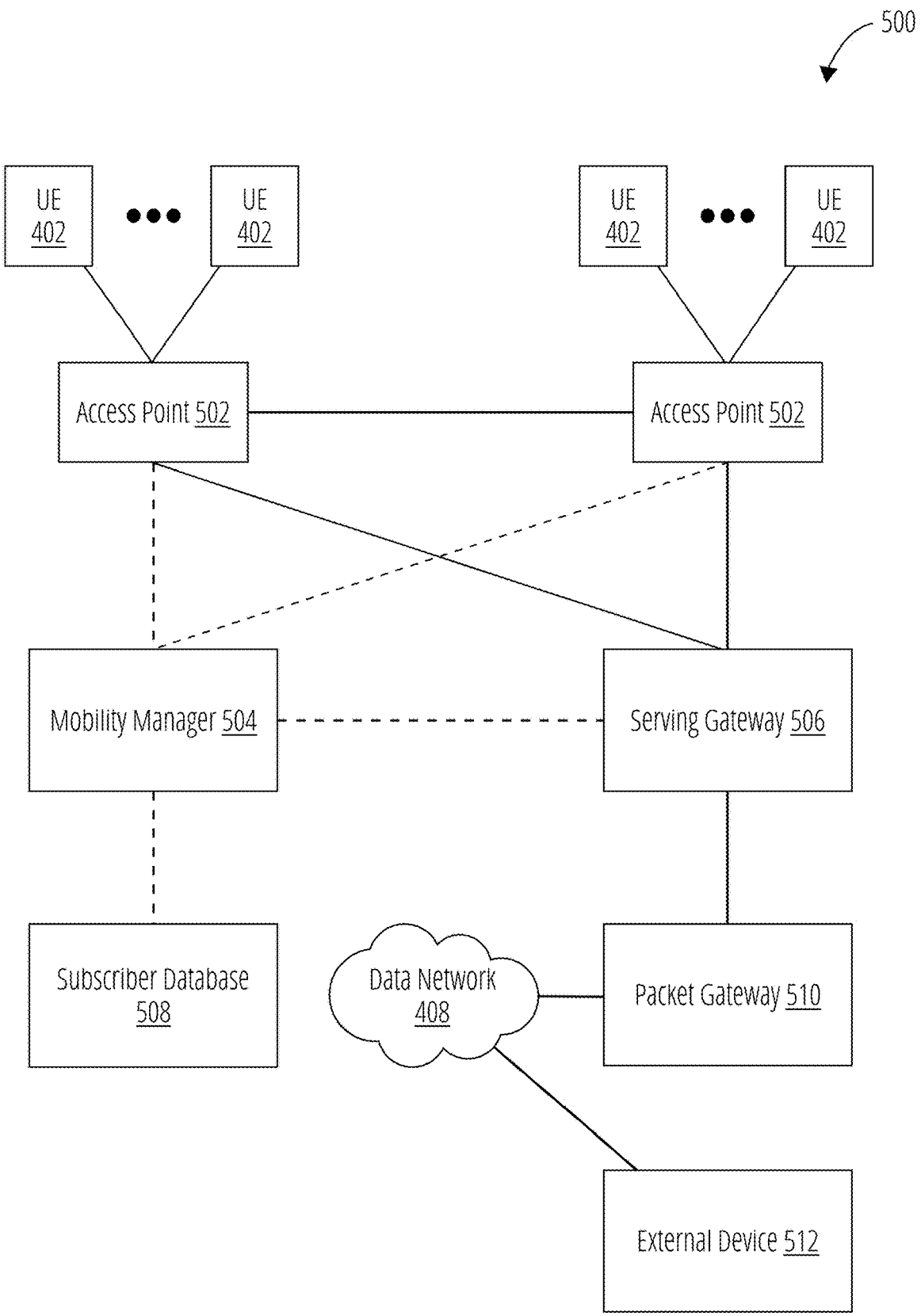
FIG. 5 is a block diagram illustrating a cellular network according to some embodiments.

FIG. 5 is a block diagram illustrating a cellular network according to some embodiments.

In the illustrated embodiment, a system 500 includes UE 402 communicatively connected to access points 502. As seen in FIG. 5, the access points 502 form an access network such as access network 404. In one embodiment, the access points 502 and UE 402 comprise a NextGen Radio Access Network (NG-RAN). In an embodiment, access points 502 comprise a plurality of gNodeB base stations connected to UE 402 via an air interface. In one embodiment, the air interface comprises a New Radio (NR) air interface. The gNodeB additionally includes multiple network interfaces for communicating with the core network and, specifically, mobility manager 504 and serving gateway 506. In one embodiment, the mobility manager 504 in a 5G network comprises an AMF. In one embodiment, the serving gateway 506 comprises an SMF for control data or UPF for user data.

In another embodiment, access points 502 comprise eNodeB base stations connected to UE 402 via an air interface. In some embodiments, the air interface comprises an E-UTRAN Uu or LTE Uu radio air interface. In these embodiments, the eNodeB provides all functionality to implement and operate the air interface and negotiates uplinks and downlinks with the UE 402. The eNodeB additionally includes multiple network interfaces for communicating with the core network and, specifically, mobility manager 504 and serving gateway 506. In one embodiment, the mobility manager 504 comprises an MME in a 4G network. In the illustrated embodiment, solid lines between network elements 504, 506, 508, 510 represent user data traffic, while dashed lines between network elements 504, 506, 508, 510 represent control or Non-Access Stratum (NAS) traffic.

In the illustrated embodiment, the mobility manager 504 manages control plane traffic while the gateway elements 506, 510 manage user data traffic. Specifically, the mobility manager 504 may comprise hardware or software for handling network attachment requests from UE 402. As part of processing these requests, the mobility manager 504 accesses a subscriber database 508. The subscriber database 508 comprises hardware or software that stores user authorization and authentication data and validates users to the network. In some embodiments, the subscriber database 508 may comprise a UDM and UDR in a 5G network. In another embodiment, the subscriber database 508 may comprise an HSS in a 4G network. In one embodiment, the subscriber database 508 may also store a location of the user updated via a Diameter or similar protocol.

The mobility manager 504 may also be configured to create data sessions or bearers between UE 402 and serving gateway 506 or gateway 510. In one embodiment, the serving gateway 506 and gateway 510 may comprise single or separate devices. In general, the serving gateway 506 routes and forwards user data packets while also acting as the mobility anchor for the user plane during access point handovers and as the anchor for mobility between different network technologies. For idle state UE 402, the serving gateway 506 terminates the downlink data path and triggers paging when downlink data arrives for the UE 402. The serving gateway 506 manages and stores UE 402 contexts, e.g., parameters of the IP bearer service, network internal routing information. In a 5G network, the serving gateway 506 may be implemented by an SMF. In a 4G network, the serving gateway 506 may be implemented by an S-GW.

The serving gateway 506 is communicatively coupled to a gateway 510. In general, the gateway 510 provides connectivity from the UE 402 to external Packet Data Networks (PDNs) such as data network 408 by being the point of exit and entry of traffic to external networks (e.g., 408). UE 402 may have simultaneous connectivity with plurality gateways, including gateway 510 for accessing multiple packet data networks. The gateway 510 performs policy enforcement, packet filtering for each user, charging support, lawful interception, and packet screening. In the illustrated embodiment, gateway 510 also limits access to endpoints such as an external device 512. In a 5G network, the gateway 510 may be implemented by a UPF. In a 4G network, the gateway 510 may be implemented by a P-GW.

In the illustrated embodiment, an external device 512 is communicatively coupled to the core network via the data network 408. In one embodiment, the data network 408 may comprise the Internet. In the illustrated embodiment, the external device 512, such as an application server, may comprise any electronic device capable of communicating with the data network 408, and the disclosure is not limited to specific types of network devices.

Figure 6:
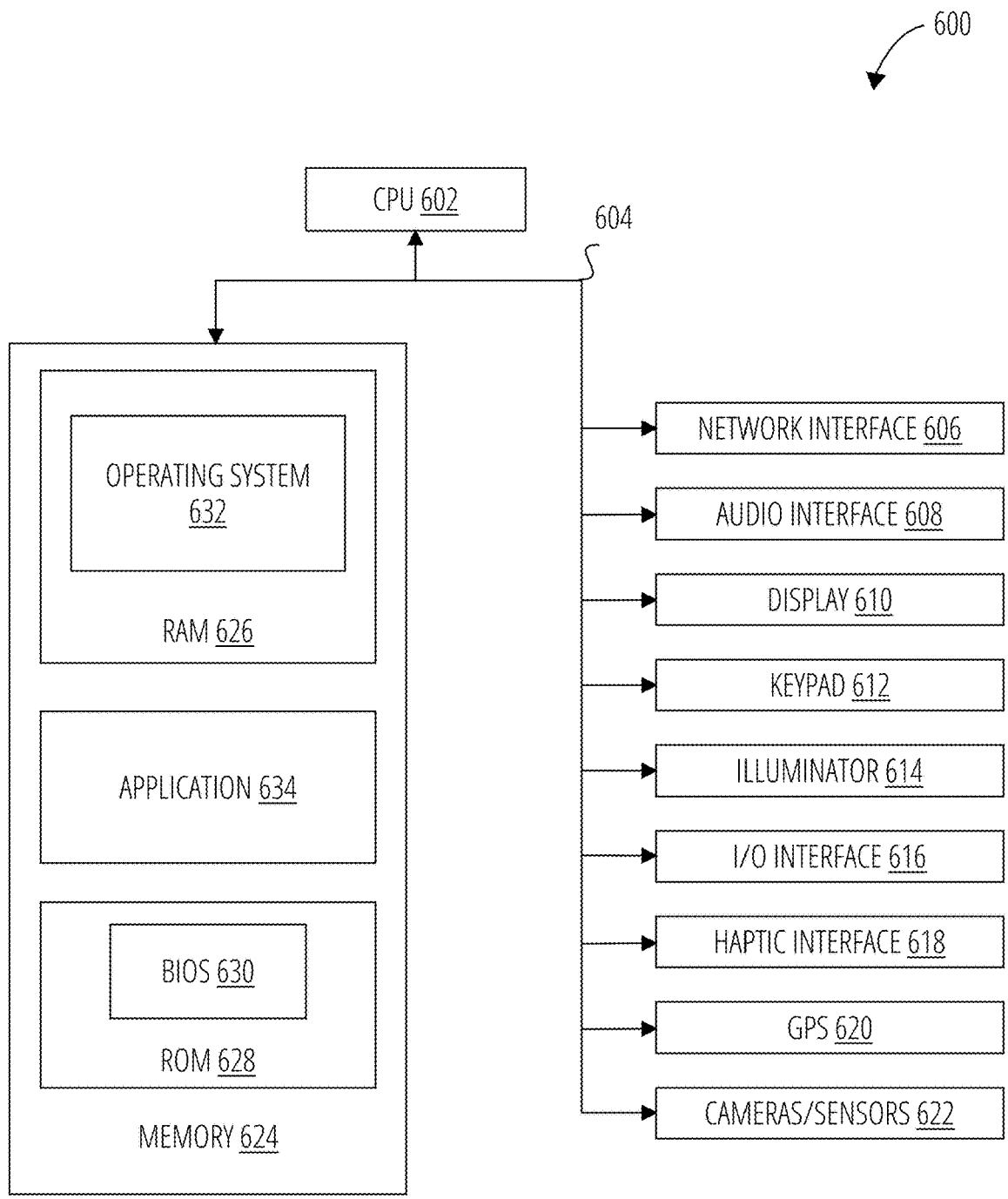
FIG. 6 is a block diagram illustrating a device showing an example of a client or server device used in various embodiments of the present disclosure.

FIG. 6 is a schematic diagram illustrating an example embodiment of a device 600 (e.g., a client device or server device) that may be used in the various embodiments of the present disclosure.

Device 600 may include more or fewer components than those shown in FIG. 6. However, the components shown are sufficient to disclose an illustrative embodiment for implementing the present disclosure. Device 600 can be a representation of UE 402 as mentioned above.

As shown in the figure, device 600 includes a processing unit (CPU) 602 in communication with a mass memory 624 via a bus 604. Device 600 also includes one or more network interface 606, an audio interface 608, a display 610, a keypad 612, an illuminator 614, an input/ouput (I/O) interface 616, a haptic interface 618, an optional global positioning systems (GPS) receiver 620, and one or more cameras or other optical, thermal or electromagnetic sensor 622.

Device 600 may optionally communicate with a base station (not shown), or directly with another computing device. Network interface 606 is sometimes known as a transceiver, transceiving device, or network interface card (NIC).

Mass memory 624 illustrates a non-limiting example of computer storage media for storage of information such as computer readable instructions, data structures, program modules or other data. Mass memory 624 can include random access memory (RAM) 626, read-only memory (ROM) 628, or any other type of memory known or to be known. Mass memory 624 can store a basic input/output system (BIOS) 630 for controlling low-level operation of device 600. The mass memory 624 can also store an operating system 632 for controlling the operation of device 600.

Applications 634 may include computer-executable instructions which, when executed by device 600, transmit, receive, and/or otherwise process audio, video, images, and enable telecommunication with a server and/or another user of another client device.

Device 600 may be referred to as a computing device or a client device, interchangeably. A computing device may be capable of sending or receiving signals, such as via a wired or wireless network, or may be capable of processing or storing signals, such as in memory as physical memory states. A client device may, include a portable and non-portable devices including without limitation, cellphones, tablets, wearables, and integrated or distributed devices combining various features, such as features of the forgoing devices, or the like. In some embodiments, device 600 may operate as a server that can provide processing, database, and communication facilities. In some embodiments, a server may be embodied in a single, physical processor with associated communications and data storage facilities, or it may be a networked or clustered complex of processors and associated network and storage devices (e.g., cloud servers).

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving, from a UE at a base station over a Primary Cell (PCell), a request message to perform an action with respect to a Secondary Cell (SCell), the request message including service information that includes an SCell activation cause parameter defined in Radio Resource Control (RRC) layer protocol indicating a type of service generating traffic for the UE;
determining a specific action to be performed with respect to the SCell based on the service information;
performing the specific action with respect to the SCell at the base station; and
transmitting a connection reconfiguration message to the UE to direct the UE to perform the specific action.

2. The method of claim 1, wherein the service information corresponds to at least one from the group consisting of a signal measurement of a signal between the UE and the base station and a Quality of Service (QOS) requirement between the UE and the base station.

3. The method of claim 1, wherein the specific action is selected from the group consisting of adding, releasing, activating, de-activating, and modifying the SCell.

4. The method of claim 1, wherein the SCell is one of a plurality of SCells and wherein performing the specific action with respect to the SCell includes providing the SCell activation cause parameter to a medium access control (MAC) layer, and selecting, by the MAC layer, the SCell from the plurality of SCells based on the SCell activation cause parameter.

5. The method of claim 1, wherein the connection reconfiguration message is a Radio Resource Control (RRC) Connection Reconfiguration Message and wherein the method further comprises receiving an RRC Connection Reconfiguration Complete Message from the UE.

6. The method of claim 1, wherein the connection reconfiguration message is transmitted using medium access control (MAC) layer signaling.

7. The method of claim 1, further comprising:
measuring, at the base station, a Voice over New Radio (VoNR) Key Performance Indicator (KPI);
detecting that the measured VoNR KPI falls below a threshold; and
initiating the specific action in response to detecting the VoNR KPI falls below the threshold, wherein the VoNR KPI comprises at least one of Call Setup Time, Call Drop Rate, and Voice Packet Gap.

8. The method of claim 1, further comprising:
receiving, from the UE, an indication that the UE is initiating an Ultra- Reliable Low Latency Communications (URLLC) service;
determining, based on the URLLC service indication, to activate multiple SCells; and
activating the multiple SCells simultaneously to support the URLLC service.

9. The method of claim 1, further comprising:
receiving the service information at a Radio Resource Control (RRC) layer;
determining, at a Medium Access Control (MAC) layer, a number of SCells to activate based on comparing the service information to stored service priority data; and
selecting specific SCells to activate from among available SCells based on signal measurements between the UE and the base station.

10. A non-transitory computer-readable storage medium for storing instructions executable by a processor, the instructions comprising:
receiving, from a UE at a base station over a Primary Cell (PCell), a request message to perform an action with respect to a Secondary Cell (SCell), the request message including service information that includes an SCell activation cause parameter defined in Radio Resource Control RRC) layer protocol indicating a type of service generating traffic for the UE;
determining a specific action to be performed with respect to the SCell based on the service information;
performing the specific action with respect to the SCell at the base station; and
transmitting a connection reconfiguration message to the UE to direct the UE to perform the specific action.

11. The computer-readable storage medium of claim 10, wherein the service information corresponds to at least one from the group consisting of a signal measurement of a signal between the UE and the base station and a Quality of Service (QOS) requirement between the UE and the base station.

12. The computer-readable storage medium of claim 10, wherein the specific action is selected from the group consisting of adding, activating, modifying, and deactivating the SCell.

13. The computer-readable storage medium of claim 10, wherein the SCell is one of a plurality of SCells and wherein performing the specific action with respect to the SCell includes providing the SCell activation cause parameter to a medium access control (MAC) layer, and selecting, by the MAC layer, the SCell from the plurality of SCells based on the SCell activation cause parameter.

14. The computer-readable storage medium of claim 10, wherein the connection reconfiguration message is a Radio Resource Control (RRC) Connection Reconfiguration Message and wherein the instructions further comprise receiving an RRC Connection Reconfiguration Complete Message from the UE.

15. The computer-readable storage medium of claim 10, wherein the connection reconfiguration message is transmitted using medium access control (MAC) layer signaling.

16. A device comprising a processor configured to:
receive, from a UE at a base station over a Primary Cell (PCell), a request message to perform an action with respect to a Secondary Cell (SCell), the request message including service information that includes an SCell activation cause parameter defined in Radio Resource Control (RRC) layer protocol indicating a type of service generating traffic for the UE;
determine a specific action to be performed with respect to the SCell based on the service information;
perform the specific action with respect to the SCell at the base station; and
transmit a connection reconfiguration message to the UE to direct the UE to perform the specific action.

17. The device of claim 16, wherein the specific action is selected from the group consisting of adding, releasing, activating, de-activating, and modifying the SCell.

18. The device of claim 16, wherein the SCell is one of a plurality of SCells and wherein performing the specific action with respect to the SCell includes providing the SCell activation cause parameter to a medium access control (MAC) layer, and selecting, by the MAC layer, the SCell from the plurality of SCells based on the SCell activation cause parameter.

19. The device of claim 16, wherein the connection reconfiguration message is a Radio Resource Control (RRC) Connection Reconfiguration Message and the processor is further configured to:
receive an RRC Connection Reconfiguration Complete message from the UE.

20. The device of claim 16, wherein the connection reconfiguration message is transmitted using medium access control (MAC) layer signaling.

* * * * *